United States Patent
Waechter et al.

(10) Patent No.: US 10,402,210 B2
(45) Date of Patent: Sep. 3, 2019

(54) OPTIMIZING USER INTERFACE REQUESTS FOR BACKEND PROCESSING

(71) Applicant: SAP SE, Walldorf (DE)

(72) Inventors: Marcel Waechter, Garben-Neudorf (DE); Andreas Hoffner, Ostringen (DE)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 15/244,725

(22) Filed: Aug. 23, 2016

(65) Prior Publication Data

US 2018/0060087 A1   Mar. 1, 2018

(51) Int. Cl.

| | |
|---|---|
| *G06F 17/30* | (2006.01) |
| *G06F 9/451* | (2018.01) |
| *G06F 3/0485* | (2013.01) |
| *G06F 16/28* | (2019.01) |
| *G06F 3/0481* | (2013.01) |
| *G06F 9/50* | (2006.01) |
| *G06F 3/0482* | (2013.01) |

(52) U.S. Cl.
CPC ............ *G06F 9/451* (2018.02); *G06F 3/0481* (2013.01); *G06F 3/0485* (2013.01); *G06F 9/5027* (2013.01); *G06F 16/287* (2019.01); *G06F 3/0482* (2013.01)

(58) Field of Classification Search
CPC ......... G06F 17/30554; G06F 17/30864; G06F 17/30442; G06F 17/30241; G06F 17/30545; G06F 17/30867; G06F 9/451; G06F 9/5027; G06F 3/0485; G06F 3/0481; G06F 16/287

See application file for complete search history.

(56) References Cited

U.S. PATENT DOCUMENTS

| | | | |
|---|---|---|---|
| 7,895,599 B2 * | 2/2011 | Muscarella | G06F 9/465 719/313 |
| 8,601,395 B2 * | 12/2013 | Wong | G06F 16/2457 715/851 |
| 8,789,144 B2 * | 7/2014 | Mazzaferri | G06F 21/6218 726/27 |
| 9,270,678 B2 * | 2/2016 | Mazzaferri | G06F 21/6218 |
| 9,400,585 B2 * | 7/2016 | Momchilov | G06F 3/0481 |
| 9,692,810 B2 * | 6/2017 | Peters | G06F 3/0481 |
| 9,807,076 B2 * | 10/2017 | Raman | H04W 12/06 |
| 2003/0229646 A1 * | 12/2003 | Bach | G06F 9/451 |
| 2004/0017397 A1 * | 1/2004 | Bach | G06F 9/451 715/762 |

(Continued)

*Primary Examiner* — Daniel A Kuddus
(74) *Attorney, Agent, or Firm* — Jones Day

(57) ABSTRACT

A computer-implemented method of user interface control includes receiving request to display data in a user interface and displaying data in a visible part of the user interface. Data requests in a hidden part of the user interface can be assigned to bins. Data requests assigned to a first bin can be transmitted to the backend computing system and a responsive output of the backend system can be displayed in the user interface. If the display request is still active and all of the data requests assigned to the first bin have been transmitted, data requests assigned to a second bin can be transmitted to the backend computing system and a responsive output of the backend computing system can be displayed in the user interface. Related apparatus, systems, techniques and articles are also described.

20 Claims, 4 Drawing Sheets

(56) References Cited

U.S. PATENT DOCUMENTS

| | | | |
|---|---|---|---|
| 2004/0107403 A1* | 6/2004 | Tetzchner | G06F 17/30905 |
| | | | 715/227 |
| 2006/0117253 A1* | 6/2006 | Polash | G06F 17/211 |
| | | | 715/247 |
| 2006/0221077 A1* | 10/2006 | Wright | G06F 17/30554 |
| | | | 345/428 |
| 2008/0295119 A1* | 11/2008 | Muscarella | G06F 9/465 |
| | | | 719/330 |
| 2009/0281976 A1* | 11/2009 | Liu | G06F 17/30905 |
| | | | 706/47 |
| 2011/0283242 A1* | 11/2011 | Chew | G06F 16/34 |
| | | | 715/863 |
| 2012/0084663 A1* | 4/2012 | Momchilov | G06F 3/0481 |
| | | | 715/744 |
| 2012/0151417 A1* | 6/2012 | Wong | G06F 16/2457 |
| | | | 715/851 |
| 2016/0062603 A1* | 3/2016 | Halbedel | G06F 3/04842 |
| | | | 715/762 |
| 2016/0328107 A1* | 11/2016 | Momchilov | G06F 3/0481 |
| 2017/0155736 A1* | 6/2017 | Schukovets | H04L 67/32 |
| 2017/0237722 A1* | 8/2017 | Raman | H04W 12/06 |
| | | | 726/7 |

\* cited by examiner

OPTIMIZING USER INTERFACE REQUESTS FOR BACKEND PROCESSING

TECHNICAL FIELD

The subject matter described herein relates to user interfaces for displaying complex data and information and to optimizing transmission of data requests for user interfaces to a backend computing system.

BACKGROUND

Modern user interfaces typically have more data that can be displayed on a single screen. Therefore, a user may navigate a user interface by scrolling, swiping, or clicking. Nevertheless, a user interface request is usually submitted to a backend computing system all at once, so that all data requested by a given user interface is prepared and sent to the user interface, regardless of whether it is being viewed by a user, or even if will ever be viewed by the user. This can lead to a bad user experience—for example, data requests of not visible (hidden) part of the user interface may slow down or block requests of the visible part of the user interface. For complex applications, where user interfaces have computation intensive data requests, sometimes including multiple HTTP requests or requests with high bandwidth demand, this approach results in unnecessary overload of the backend computing resources. Furthermore, since backend computing resources handle data requests for data that is not being displayed on a visible part of a user interface, these resources may become unavailable, or underperforming, when a new user interface request is sent to a backend computing system because of a user's scroll or swipe action.

Managing user interface data requests is not easy for a user interface developer. This is because any improvement in backend performance in handling user interface data requests depends on the knowledge of how the user will use the application, what visual output devices will be used, and the characteristics of the backend computing system. Such information is not available to a user interface developer. Currently, there is no viable system for optimizing user interface requests that can be implemented at the user interface development stage.

SUMMARY

In a first aspect, a display request to display data in a user interface is received. The display request can include data requests to obtain data from a backend computing system. Data requests can be separated into requests for data in a visible part of the user interface and requests for data in a hidden part of the user interface. Such separation can based on contextual and pre-defined parameters. Data in a visible part of the user interface can be displayed.

Data requests in the hidden part of the user interface can be assigned to bins based on a data load time, an effect on performance of the backend computing system, and a dynamics of display requests. Data requests assigned to a first bin can be transmitted to the backend computing system and a responsive output of the backend system can be displayed in the user interface. If the display request is still active and all of the data requests assigned to the first bin have been transmitted, data requests assigned to a second bin can be transmitted to the backend computing system and a responsive output of the backend computing system can be displayed in the user interface.

User interface control can include, if the display request is still active, transmitting data requests assigned to a third bin to the backend computing system and displaying a responsive output of the backend computing system in the user interface. User interface control can include, if the display request is still active, transmitting data requests assigned to a fourth bin of the plurality of bins to the backend computing system and displaying a responsive output of the backend computing system in the user interface.

The data requests assigned to the first bin can have a minimum load time and be not performance critical. The data requests assigned to the second bin can have a medium load time, which is longer than a minimum load time, and be not performance critical. The data requests assigned to the third bin can have a medium load time and be performance critical. The data requests assigned to the fourth bin can have a high load time and be performance critical.

The contextual parameters can include personalization, field control and adaptations to account for a display size. The pre-defined parameters can include default settings and menus. The dynamics of display requests can include speed of scrolling, direction of scrolling, speed of swiping, direction of swiping, and speed of clicking.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides that data requests from user interface applications to the backend are optimized automatically without any complex, error-prone and inflexible implementation logic. The current approaches are also advantages in that they can be integrated seamlessly in existing user interface applications in a non-disruptive manner. The optimized data requests result in a better user experience due to a faster response and a reduction of backend resources usage.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
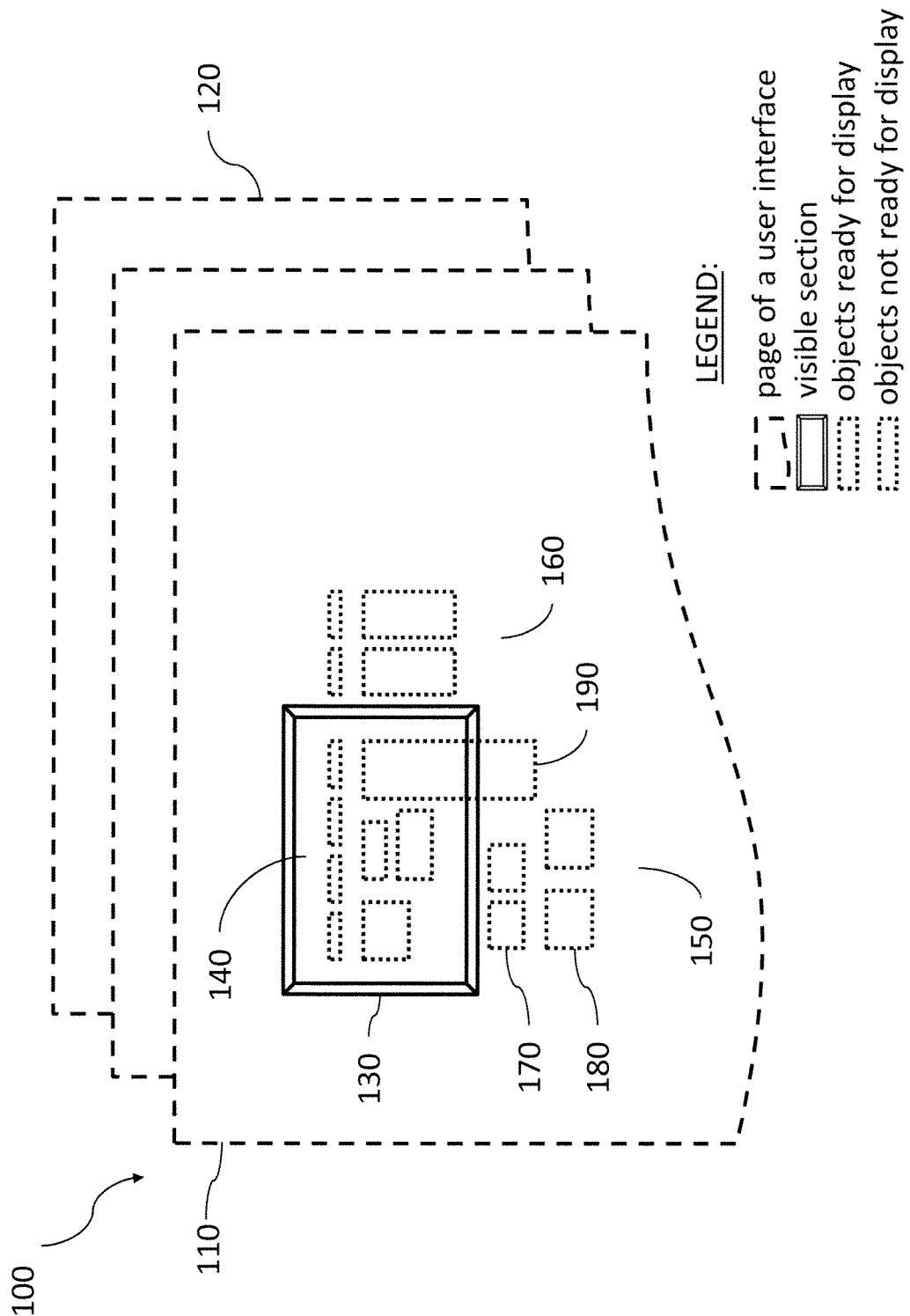
FIG. 1 is a diagram illustrating of a user interface.

Early business related web user interface applications contained only a few sets of data on screen and a user needed to navigate to a next page or to open a panel to retrieve further information. With more modern user interfaces, users are accustomed to having all data on the screen—and if the user wants to see additional information, he or she scrolls down. Clicking or pressing navigation bars allows to jump directly to the part of the screen showing the desired information. This layout pattern is user friendly and fast, but it adds complexity and performance issues for business applications, because the data shown on the screen is not a static resource, but, rather, is distributed in a deeply nested hierarchy of business objects. When such data is requested in individual requests, it leads to a high usage of backend computational resources.

Modern applications, such as UI5 user interface applications, are able to respond to the characteristics of devices that are used and to adapt their visualization and selection of data to display to the demands and capabilities of the devices. Depending on the device, it may be required to scroll or swipe the page or to click on data to see further details and to show the necessary data. It is also possible to personalize the display to a certain extent, so that the user can decide what kind of information he wants to see.

It is difficult for user interface developers to optimize the data requests which are sent to the backend because they typically do not know what kind of data is finally shown to the users when they develop the user interface. As a consequence, the full amount of data is usually requested which leads to a negative performance impact on the backend and affects the client as well. This leads to situations where data is requested which is currently not visualized and might be outdated by the time the user can see it. In some cases, a re-read of the data is triggered. In addition to that, data which is not shown to the user at all may be requested.

The result of these not-optimized data requests is that unnecessary calculations and aggregations in the backend cause a high usage of resources. Also, the users need to wait for the results as data which is not required, or not yet required, is requested and selected, calculated, and/or aggregated. Furthermore, large amounts of data need to be transferred, that causes significant latency, especially where mobile phones/mobile networks are used. Clients need to process data and manage local models for data which might not be used at all.

A user interface controller is provided herein which analyzes the user interface during runtime and then tailors the data requests to the backend to the exact needs to the current user interface state considering various parameters, such as personalization and the visible user interface part. A user interface controller can be a UI5 controller. A data request pre-processing step during runtime generates the required projection and aggregation requests by considering nested data structures and object hierarchies. The projection may be an OData projection. This approach ensures that only necessary data is requested and that the data is present once it is needed.

In more detail, the user interface controller can optimize the open data protocol non-modifying requests to the backend that are related to user interface data binding. The user interface controller can also analyze all entities and properties which are available on the user interface after personalization, field control and adaptations (if needed, when using of a device with a smaller real estate), and analyze which data is currently in the hidden area of the browser and for which the user needs to swipe or scroll to see it. The open data protocol can be OData protocol.

By analyzing annotations, such as the OData $metadata document or other annotation documents or files, those hidden entities and navigation properties that result in one or more data requests or that cause resource-intensive calculations and/or aggregations are suppressed. Depending on the application configuration, such data requests are either sent in a separate request or sent only once the user scrolls or swipes to it. Sending data in a separate request avoid a situation (which can occur due to selection, calculation, and/or aggregation of a hidden field) where the complete data request is pending and the user needs to wait for the response to see the data on the visible fields. Instead, data is already calculated so once the user scrolls or swipes to it the data is most likely available. Sending a request only once the user scrolls or swipes to it reduces the amount of resources used in the backend.

Once the user scrolls or swipes to read data, the controller can predict which data shall also be requested based on the scroll/swipe direction and speed to minimize situations that a user faces user interface areas that are not yet filled.

This controller can be used by UI5 frameworks (like Smart Templates, Smart Business) or by handwritten applications.

The advantage of the described process is that data requests from UI5 applications to the backend are optimized automatically without any complex, error-prone and inflexible implementation logic from user interface developers. The described approach can be integrated seamlessly in almost all existing UI5 applications in a non-disruptive manner. The optimized data requests result in a better user experience due to a faster response and a reduction of backend resources.

All data requests can be assigned to one of several bins. One bin can be for default data requests. Another bin can be deferred/always data requests. Yet another bin can be for deferred/visible data requests. Yet another bin can be for single requests. Assignments to bins can be conducted according to criticality of data requests, where criticality is a measure of the potential performance impact or performance cost of a given data request.

Data requests assigned to the default bin can include data requests with low criticality. These requests can have one or more of the following characteristics: minimum load time, not performance critical. This is the default option that is used for all properties and navigation properties for which no other type is set. In addition, all properties with the default setting which belong to the same entity type of any of the properties or navigation properties that are shown on the initial screen and requested with the first request are also requested. One example of a default data request is Master Data. All properties and navigation properties that are shown on the initial screen can be requested via a $batch request with GET requests using $select.

Data requests assigned to the deferred/always bin can include data requests with medium criticality. These requests can have one or more of the following characteristics: medium load time, not performance critical. One example of a deferred/always data request is a 1:n association like a table of sales order items assigned to a sales order. Those properties and navigation properties are loaded in a second $batch request once the data shown on the first screen are loaded. Those properties can be set for properties which are calculated or aggregated in the backend or for 1:n associations with large amount of data and are most likely shown on the initial screen. Therefore, the user will receive the other data in a shorter time and will see a loading indicator for deferred/always properties. These properties can be close to the visible screen and the user will likely scroll or swipe to this section. These properties can be on the bottom of the screen but the user most likely will scroll/swipe down to bottom of the page.

Data requests assigned to the deferred/visible bin can include data requests with high criticality. These requests can have one or more of the following characteristics: medium load time, performance critical. One example of a deferred/visible data request is an aggregation measure such as a Key Performance Indicator (KPI). Those properties or navigation properties are loaded in a $batch request once the user scrolls or swipes down and the property is visible or is very close to the visible screen. Those properties should be set for properties which are calculated or aggregated in the backend or for 1:n associations with large amount of data and are most likely not visible on the initial screen and the user is not likely to scroll down. If they are visible due to a large surface area of the screen, they are automatically handled as deferred/always to avoid slowing down the initial data request.

Setting the properties to deferred/always or deferred/visible can only be done by product experts as they know their product best. In this respect, there can be two types of applications. In one type of an application, a user browses through a large number of objects. The objects contain a lot of data and information. The user immediately knows if he is interested in a particular object or not. If the user is interested, but does not want to see all data, then as many properties as possible shall be set to deferred/visible to reduce the load of the backend.

In another type of an application, a user can be assigned to different objects in a work list, he works on one object, performs some actions or modifications, validates the complete object and activates. Then the cost intensive properties can be set to deferred/visible, while the others can be kept as default to ensure a good working experience for the user.

Data requests assigned to the single request bin can include data requests with very high criticality. These requests can have one or more of the following characteristics: high load time, very performance critical, would slow down all other requests. One example of a single data request is Mass Data Aggregation KPI.

The described process occurs whenever a page change event is triggered. This can happen once the application is initially loaded, but also once the next page section is reached. The sections are calculated at the start of the application and the size of the sections are configurable by the application. Page sections can be built after each full monitor size, but smaller sections are also possible. Those sections are hidden, and the event is triggered when they reach the vicinity of visible area (although they are still hidden).

When such a page change event is triggered, the described process is executed. This can result in several requests. All of them are optional, so there could be none to more than four. The first request can include Default visible, and Default invisible & Derivable (=in same Entity Type). The second request can include Deferred/Always visible, Deferred/Visible visible, and Default invisible & Derivable (=in same Entity Type). The third request can include Deferred/Always invisible. The $n^{th}$ request can include Single Request visible.

The flow of the three events implemented to achieve this optimization is now described. Three events can include Initial Load, After Initial Load, and User Scrolls or Swipes. In the Initial Load, the process can include one or more of the following steps: suspend all bindings or deactivate the binding because data is not requested; get all visible controls, optionally controls that are very close to the visible area (this step is configurable); get properties and navigation properties of this page section; resume binding in case of default setting, add marker for deferred/always processing in case of deferred/always or deferred/visible properties; get entity types of visible properties and navigation properties; get all controls and binding property on page; check for each default property if binding is still suspended, if yes check if a property of the same entity type is shown, if yes resume binding.

After Initial Load of Data Finished, the process can include one or more of the following steps: get all controls with its bound properties on page; check if annotated as deferred/always, if yes resume binding; resume binding of all controls that were marked in the initial load processing.

In the User Scrolls or Swipes event, the process can include one or more of the following steps: get all visible controls, optionally controls that are very close to the visible section (this step can be configurable); get bound properties and navigation properties, check if binding is suspended, if yes resume binding; get entity types of those properties and navigation properties; get all controls and their binding properties on page; check for each property with default if binding is still suspended, if yes check if the property is of the same entity type as the resumed one, if yes resume binding.

FIG. 1 is an illustration of a user interface. A user interface 100 can consist of a top level page 110 and optional lower level pages 120. There can be one or more lower level pages 120, or there can be no lower level pages 120 in a user interface. If present, lower level pages 120 can be accessed by clicking a menu button on screen 130, or by other controllable means by a user. Top level page 110 of user interface 100 can have a visible section 140 and a hidden section. Hidden section can be below visible section (as shown by element 150) or above visible section (not shown). Hidden section can also be to the right of visible section (as shown by element 160) or to the left of visible section (not shown).

User interface 100 can include many objects, such as 170, 180, and 190. To display an object or to prepare to display an object, a calculation by the backend needs to be completed. Depending on the difficulty and complexity of a calculation required to display an object, some objects in a hidden area of user interface can be ready for display (shown by shaded background, such as element 170 and full element 190). Some objects, especially those that are calculation intensive or are far from a visible area of user interface, can be not ready for display (shown by clear background, such as element 180).

Figure 2:
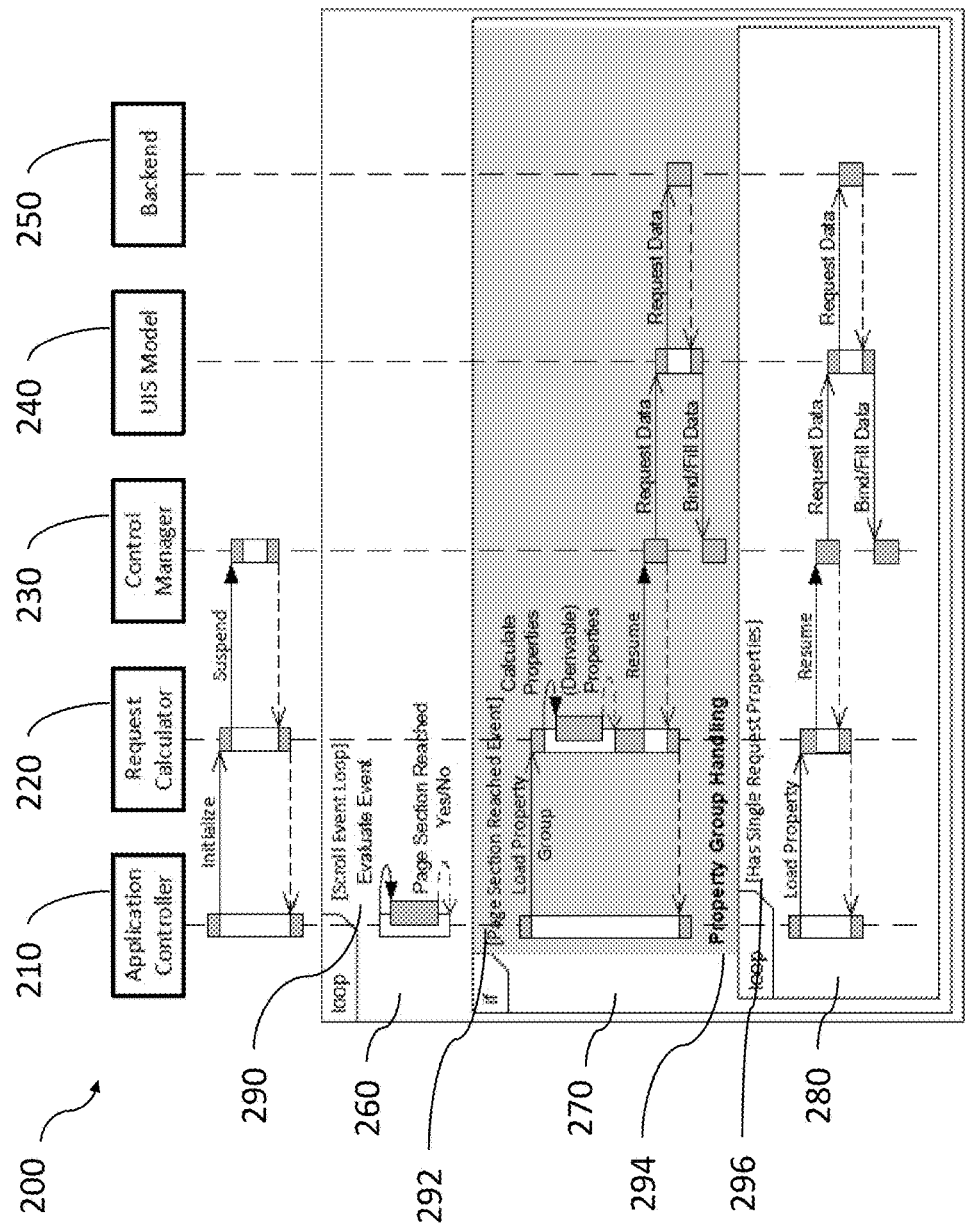
FIG. 2 is a data flow diagram of optimizing user interface requests for backend processing.

FIG. 2 is an illustration of a process of optimizing user interface requests. FIG. 2 shows a process 200 which is an example of optimizing user interface requests. The control and calculations related to user interface are executed by an application controller 210, a request calculator 220, a control manager 230, a user interface model 240 (an example of UI5 model is illustrated), and a backend 250.

In some variations, a highest level of a process can be illustrated by a scroll event loop 260. In some variations, the next lower level of the process is an IF operator 270 for a page section reached event. In some variations, the next lower level of the process is a single request properties loop 280.

In the initialization phase of the application/screen a central application controller 210 can suspend all controls on the screen through the request calculator 220 and control manager 230. UI5 usually loads the data automatically based on the bindings which need to be suppressed in order to optimize the data requests. An event loop/handler 290 can be registered for scrolling/swipe events and can evaluate whether a page section has been reached. As soon as a page section is reached, 292, the data request calculation can be triggered. A page section in this case is a certain area which needs to be navigated through before an event is raised. The area can either be defined in an absolute way (e.g. pixel-based) or in an relative way (e.g. ten percent of the current screen). The property group handling 294 can start now to calculate the required data for the current screen and can begin with the first bin/property group (default). It can calculate all properties which need to be loaded and also the ones which can be derived, e.g. properties which can be loaded in the same request without a large computational overhead. In the next step all properties and their associated controls can be set to resume. This can be an indicator for the UI5 model to initiate the data requests in the standard way. These steps can be repeated for the next bins/property groups (deferred/always, deferred/visible) if defined via the annotations. Finally the process can check, 296, for single request properties which are expectedly long running requests and can trigger the requests accordingly.

Figure 3:
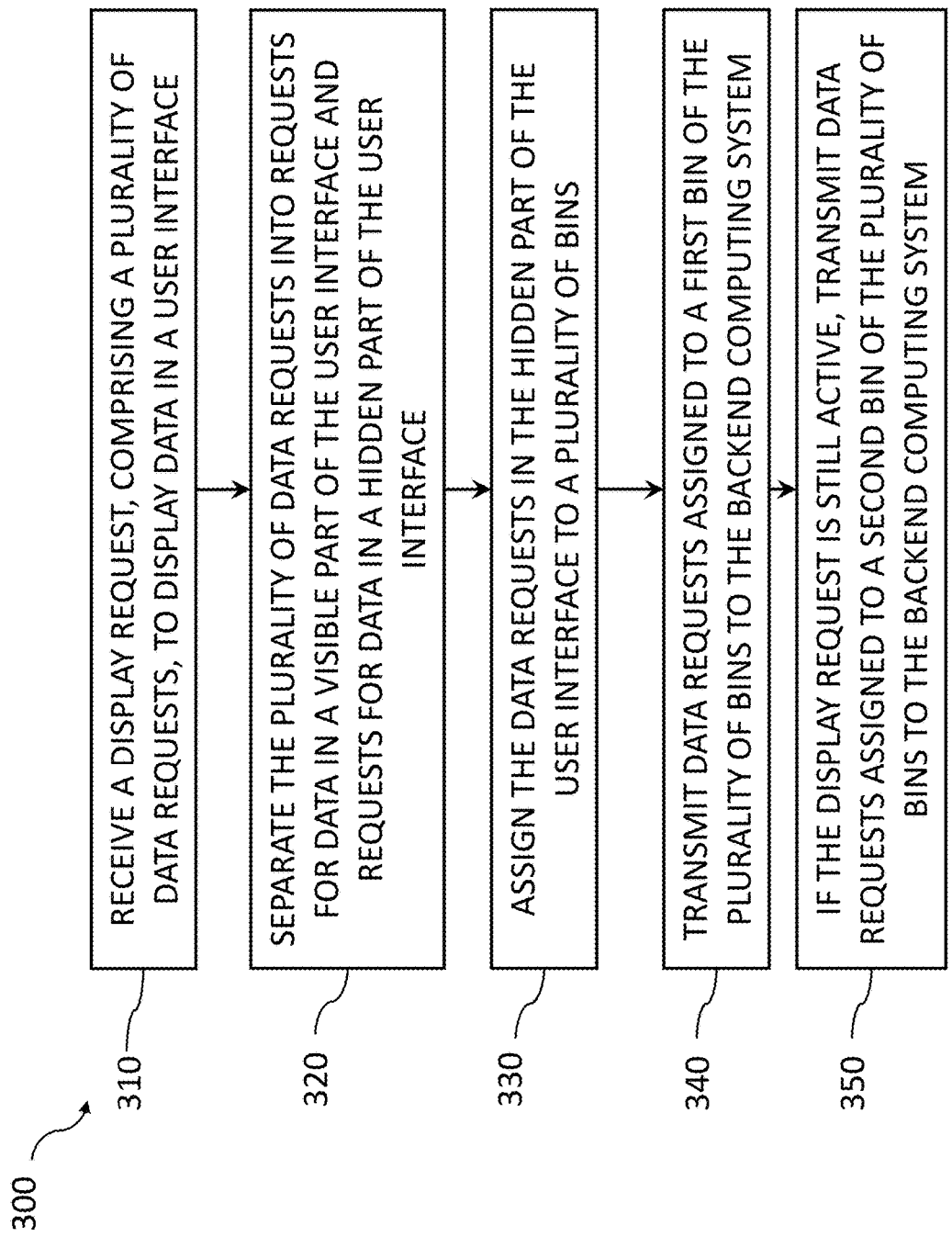
FIG. 3 is a process flow diagram illustrating optimization of user interface requests for backend processing.

FIG. 3 is a process flow diagram 300 in which, at 310, a display request is received that includes many data requests to display data in a user interface. Subsequently, the data requests can be separated, at 320, into requests for data in a visible part of the user interface and requests for data in a hidden part of the user interface. In addition, at 330, data requests in the hidden part of the user interface can be assigned to several bins. The data requests are assigned, at 340, to a first bin of the plurality of bins can be transmitted to the backend computing system. If the display request is still active, at 350, data requests assigned to a second bin of the plurality of bins are be transmitted to the backend computing system.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable data processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

Figure 4:
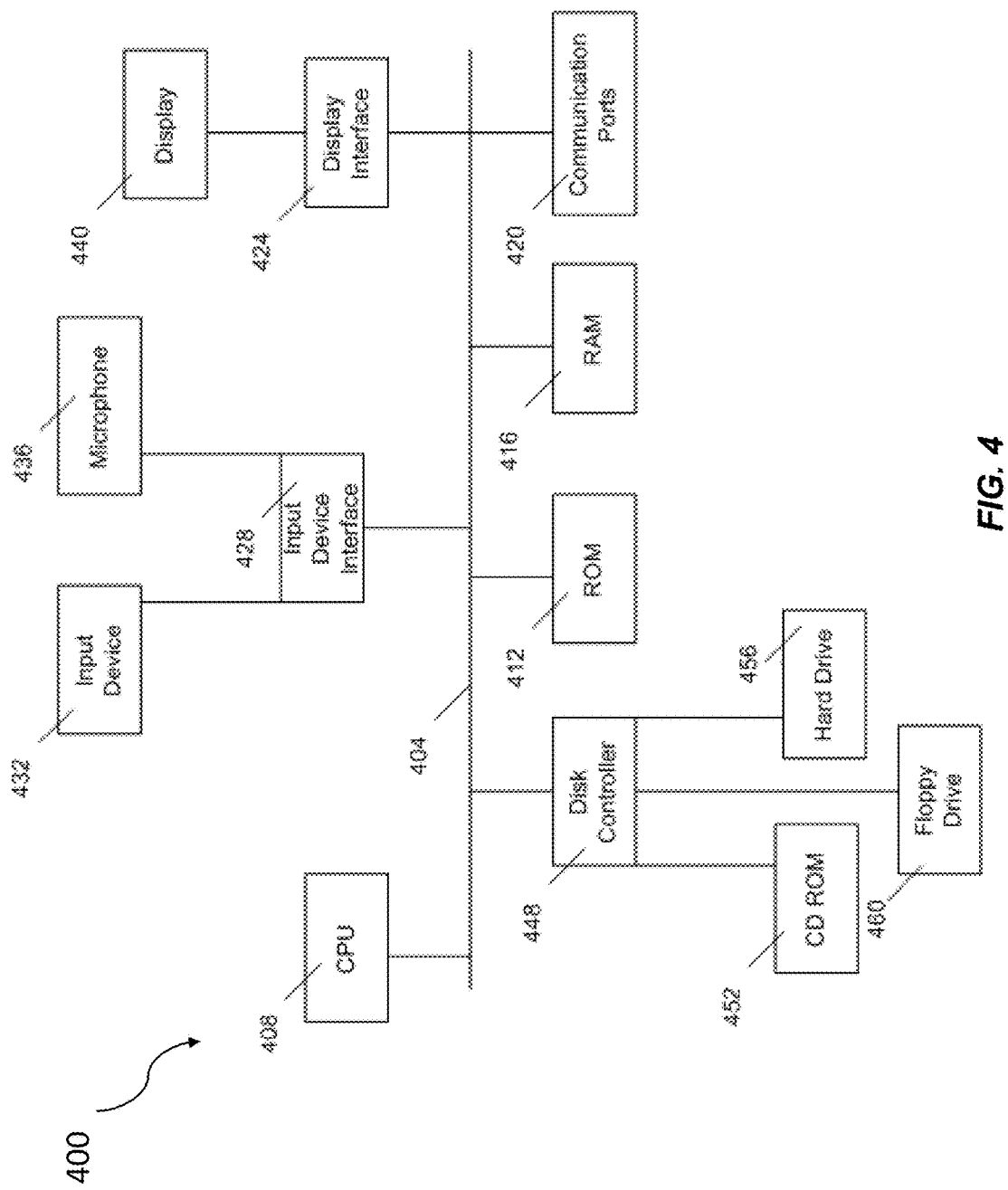
FIG. 4 is a diagram illustrating aspects of a computing device for implementation of one or more aspects of the current subject matter.

FIG. 4 is a diagram illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 414, can be in communication with the processing system 408 and may include one or more programming instructions for the operations specified here. Optionally, program instructions may be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives may be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user may provide input to the computer. Other kinds of devices may be used to provide for interaction with a user as well; for example, feedback provided to the user may be any form of sensory feedback (e.g., visual feedback, auditory feedback by way of a microphone 436, or tactile feedback); and input from the user may be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method of user interface control comprising:
    receiving a display request to display data in a user interface, the display request comprising a plurality of data requests to obtain data from a backend computing system;
    separating the plurality of data requests into requests for data in a visible part of the user interface and requests for data in a hidden part of the user interface, based on contextual and pre-defined parameters;
    displaying data in the visible part of the user interface;
    assigning the data requests in the hidden part of the user interface to a plurality of bins based on at least one of: a data load time, a reduction in performance of the backend computing system, and a dynamics of display requests, each bin comprising one or more data requests;
    assigning data requests that have a minimum load time and do not reduce performance of the backend computing system to a first bin;
    assigning data requests that have a medium load time, which is longer than the minimum load time, and do not reduce performance of the backend computing system, to a second bin;
    transmitting data requests assigned to the first bin of the plurality of bins to the backend computing system, wherein the data requests assigned to the first bin have a minimum load time and do not reduce performance of the backend computing system, and, when a page change event is triggered, displaying a responsive output of the backend system in the user interface;
    transmitting data requests assigned to the second bin of the plurality of bins to the backend computing system and displaying a responsive output of the backend computing system in the user interface.

2. The method of claim 1, further comprising transmitting data requests assigned to a third bin of the plurality of bins to the backend computing system and displaying a responsive output of the backend computing system in the user interface.

3. The method of claim 2, further comprising transmitting data requests assigned to a fourth bin of the plurality of bins to the backend computing system and displaying a responsive output of the backend computing system in the user interface.

4. The method of claim 2, wherein the data requests assigned to the third bin have the medium load time and reduce performance of the backend computing system.

5. The method of claim 3, wherein the data requests assigned to the fourth bin have a high load time and reduce performance of the backend computing system.

6. The method of claim 1, wherein the contextual parameters comprise at least one of the following: personalization, field control and adaptations to account for a display size.

7. The method of claim 1, wherein the pre-defined parameters comprise at least one of the following: default settings and menus.

8. The method of claim 1, wherein the dynamics of display requests comprises at least one of the following: speed of scrolling, direction of scrolling, speed of swiping, direction of swiping, and speed of clicking.

9. A computer system to control a graphical user interface, comprising:
    at least one data processor; and
    a memory storing instruction which, when executed by the at least one data processor, result in operations comprising:
        receiving a display request to display data in a user interface, the display request comprising a plurality of data requests to obtain data from a backend computing system;
        separating the plurality of data requests into requests for data in a visible part of the user interface and requests for data in a hidden part of the user interface, based on contextual and pre-defined parameters;

displaying data in the visible part of the user interface;

assigning the data requests in the hidden part of the user interface to a plurality of bins based on at least one of: a data load time, a reduction in performance of the backend computing system, and a dynamics of display requests, each bin comprising one or more data requests;

assigning data requests that have a minimum load time and do not reduce performance of the backend computing system to a first bin;

assigning data requests that have a medium load time, which is longer than the minimum load time, and do not reduce performance of the backend computing system, to a second bin;

transmitting data requests assigned to the first bin of the plurality of bins to the backend computing system and displaying a responsive output of the backend system in the user interface;

transmitting data requests assigned to the second bin of the plurality of bins to the backend computing system and displaying a responsive output of the backend computing system in the user interface.

10. The computer system of claim 9, wherein the operations further comprise transmitting data requests assigned to a third bin of the plurality of bins to the backend computing system and displaying a responsive output of the backend computing system in the user interface.

11. The computer system of claim 10, wherein the operations further comprise transmitting data requests assigned to a fourth bin of the plurality of bins to the backend computing system and displaying a responsive output of the backend computing system in the user interface.

12. The computer system of claim 10, wherein the data requests assigned to the third bin have the medium load time and reduce performance of the backend computing system.

13. The computer system of claim 11, wherein the data requests assigned to the fourth bin have a high load time and reduce performance of the backend computing system.

14. The computer system of claim 9, wherein the contextual parameters comprise at least one of the following: personalization, field control and adaptations to account for a display size.

15. The computer system of claim 9, wherein the pre-defined parameters comprise at least one of the following: default settings and menus.

16. The computer system of claim 9, wherein the dynamics of display requests comprises at least one of the following: speed of scrolling, direction of scrolling, speed of swiping, direction of swiping, and speed of clicking.

17. A non-transitory computer readable medium containing program instructions, wherein execution of the program instructions by one or more processors of a computer system causes one or more processors to perform operations comprising:

receiving a display request to display data in a user interface, the display request comprising a plurality of data requests to obtain data from a backend computing system;

separating the plurality of data requests into requests for data in a visible part of the user interface and requests for data in a hidden part of the user interface, based on contextual and pre-defined parameters;

displaying data in the visible part of the user interface;

assigning the data requests in the hidden part of the user interface to a plurality of bins based on at least one of: a data load time, a reduction in performance of the backend computing system, and a dynamics of display requests, each bin comprising one or more data requests;

assigning data requests that have a minimum load time and do not reduce performance of the backend computing system to a first bin;

assigning data requests that have a medium load time, which is longer than the minimum load time, and do not reduce performance of the backend computing system, to a second bin;

transmitting data requests assigned to the first bin of the plurality of bins to the backend computing system, wherein the data requests assigned to the first bin have a minimum load time and do not reduce performance of the backend computing system, and, when a page change event is triggered, displaying a responsive output of the backend system in the user interface; and transmitting data requests assigned to the second bin of the plurality of bins to the backend computing system and displaying a responsive output of the backend computing system in the user interface.

18. The non-transitory computer readable medium of claim 17, wherein the operations further comprise: transmitting data requests assigned to a third bin of the plurality of bins to the backend computing system and displaying a responsive output of the backend computing system in the user interface.

19. The non-transitory computer readable medium of claim 17, wherein the operations further comprise: transmitting data requests assigned to a fourth bin of the plurality of bins to the backend computing system and displaying a responsive output of the backend computing system in the user interface.

20. The method of claim 18, wherein the data requests assigned to the third bin have the medium load time and reduce performance of the backend computing system.

* * * * *